(12) United States Patent
Kokkala et al.

(10) Patent No.: US 10,565,677 B2
(45) Date of Patent: Feb. 18, 2020

(54) SYSTEM AND METHOD FOR ADAPTIVE Z-BUFFER COMPRESSION IN LOW POWER GPUS AND IMPROVED MEMORY OPERATIONS WITH PERFORMANCE TRACKING

(71) Applicant: THINK SILICON SA, Patras (GR)

(72) Inventors: Chrysa Kokkala, Patras (GR);
Georgios Keramidas, Patras (GR);
Iakovos Stamoulis, Patras (GR);
George Sidiropoulos, Patras (GR)

(73) Assignee: THINK SILICON SA, Patras (GR)

( * ) Notice: Subject to any disclaimer, the term of this patent is extended or adjusted under 35 U.S.C. 154(b) by 15 days.

(21) Appl. No.: 15/824,062

(22) Filed: Nov. 28, 2017

(65) Prior Publication Data
US 2019/0114736 A1     Apr. 18, 2019

Related U.S. Application Data
(60) Provisional application No. 62/572,582, filed on Oct. 16, 2017.

(51) Int. Cl.
*G06T 1/60*      (2006.01)
*G06F 12/0875*   (2016.01)
*G06T 9/00*      (2006.01)

(52) U.S. Cl.
CPC ............ *G06T 1/60* (2013.01); *G06F 12/0875* (2013.01); *G06T 9/00* (2013.01); *G06F 2212/455* (2013.01)

(58) Field of Classification Search
CPC .. G06T 1/60; G06T 12/0875; G06T 2212/455
See application file for complete search history.

(56) References Cited

U.S. PATENT DOCUMENTS

| | | | |
|---|---|---|---|
| 6,762,758 B2 | 7/2004 | Morein et al. | |
| 6,961,057 B1 * | 11/2005 | Van Dyke | G06T 15/405 345/422 |
| 9,390,464 B2 | 7/2016 | Amsinck et al. | |
| 9,607,356 B2 | 3/2017 | Lassen et al. | |
| 9,741,089 B2 | 8/2017 | Lassen et al. | |
| 2002/0042861 A1 * | 4/2002 | Kavipurapu | G06F 12/0864 711/118 |

(Continued)

*Primary Examiner* — Diane M Wills
(74) *Attorney, Agent, or Firm* — Jason H. Vick; Sheridan Ross, PC

(57) ABSTRACT

Z-buffer compression may be useful for reducing memory usage bandwidth and for performance optimizations. A trackable method of doing the same may be additionally advantageous, as a lossy z-buffer compression scheme may noticeably alter a displayed object. A z-buffer compression unit receives an uncompressed tile, including a matrix of fragments, each representing a pixel and including a z-value. A minimum and maximum z-values of the tile are determined, and a comparison between each z-value of the tile to the minimum/maximum z-value generates a difference value. Basic tile information is then stored, and a compressed tile is stored in the z-buffer memory if the difference value is below a first threshold, such that each fragment is represented by a difference value and an indicator bit, to indicate if the difference is from the minimum z-value or the maximum z-value. The basic tile information includes the minimum z-value, and the maximum z-value.

21 Claims, 8 Drawing Sheets

(56) References Cited

U.S. PATENT DOCUMENTS

| | | | |
|---|---|---|---|
| 2003/0038803 A1* | 2/2003 | Morein | G06T 15/405 |
| | | | 345/421 |
| 2004/0174369 A1* | 9/2004 | Cui | G06T 9/005 |
| | | | 345/501 |
| 2005/0195187 A1* | 9/2005 | Seiler | G06T 15/405 |
| | | | 345/422 |
| 2006/0209065 A1* | 9/2006 | Lapidous | G06T 15/40 |
| | | | 345/422 |
| 2013/0265305 A1* | 10/2013 | Hasselgren | G06T 9/00 |
| | | | 345/422 |
| 2014/0192075 A1 | 7/2014 | Stamoulis et al. | |
| 2015/0325037 A1* | 11/2015 | Lentz | G06T 1/20 |
| | | | 345/419 |
| 2017/0372506 A1* | 12/2017 | Surti | G06T 15/80 |

* cited by examiner

|        |        |        |        |
|--------|--------|--------|--------|
| 484848 | 484848 | 484848 | 484848 |
| 8a8a8a | 555555 | 555555 | 555555 |
| 8a8a8a | 555555 | 555555 | 555555 |
| 8a8a8a | 555555 | 555555 | 555555 |

411
412
413
410

|        |        |        |        |
|--------|--------|--------|--------|
| 484848 | 484849 | 48484a | 48484b |
| 8a8a8a | 8a8a90 | 484850 | 484851 |
| 8a8a8c | 8a8a92 | 484856 | 484857 |
| 8a8a8e | 8a8a94 | 48485c | 48485d |

421
420
422

|    |    |    |    |
|----|----|----|----|
| 00 | 01 | 02 | 03 |
| 8a | 84 | 08 | 09 |
| 88 | 82 | 0e | 0f |
| 86 | 80 | 14 | 15 |

SYSTEM AND METHOD FOR ADAPTIVE Z-BUFFER COMPRESSION IN LOW POWER GPUS AND IMPROVED MEMORY OPERATIONS WITH PERFORMANCE TRACKING

RELATED APPLICATION DATA

This application claims the benefit of and, under 35 U.S.C. § 119(e), priority to, U.S. Provisional Patent Application No. 62/572,582, filed Oct. 16, 2017, entitled "A System and Method for Adaptive Z-Buffer Compression in Low Power GPUs and Improved Memory Operations With Performance Tracking," which is incorporated herein by reference in its entirety.

FIELD

An exemplary embodiment of the disclosure generally relates to graphic processing units (GPUs) and particularly to improved z-buffer operation of 3D GPUs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Numerous compression techniques are used to compress video and image generation, typically due to costly memory accesses. The prior art typically teaches that a compression may be lossless, i.e., all information is recoverable, or lossy, meaning a portion of the information cannot be accurately recovered. For z-buffer compression, a lossy compression may mean generating artifacts on an image which would be immediately noticeable. Therefore, a lossy compression is typically undesirable for such uses. It would be advantageous to reduce the memory accesses to z-buffer memory, without the undesirable effects of a lossy compression scheme.

BRIEF DESCRIPTION OF THE DRAWINGS

The foregoing and other objects, features and advantages will become apparent and more readily appreciated from the following detailed description taken in conjunction with the accompanying drawings, in which:

FIG. 4—is a schematic illustration of a tile compression scheme, implemented in accordance with an embodiment.

DETAILED DESCRIPTION

Figure 1:
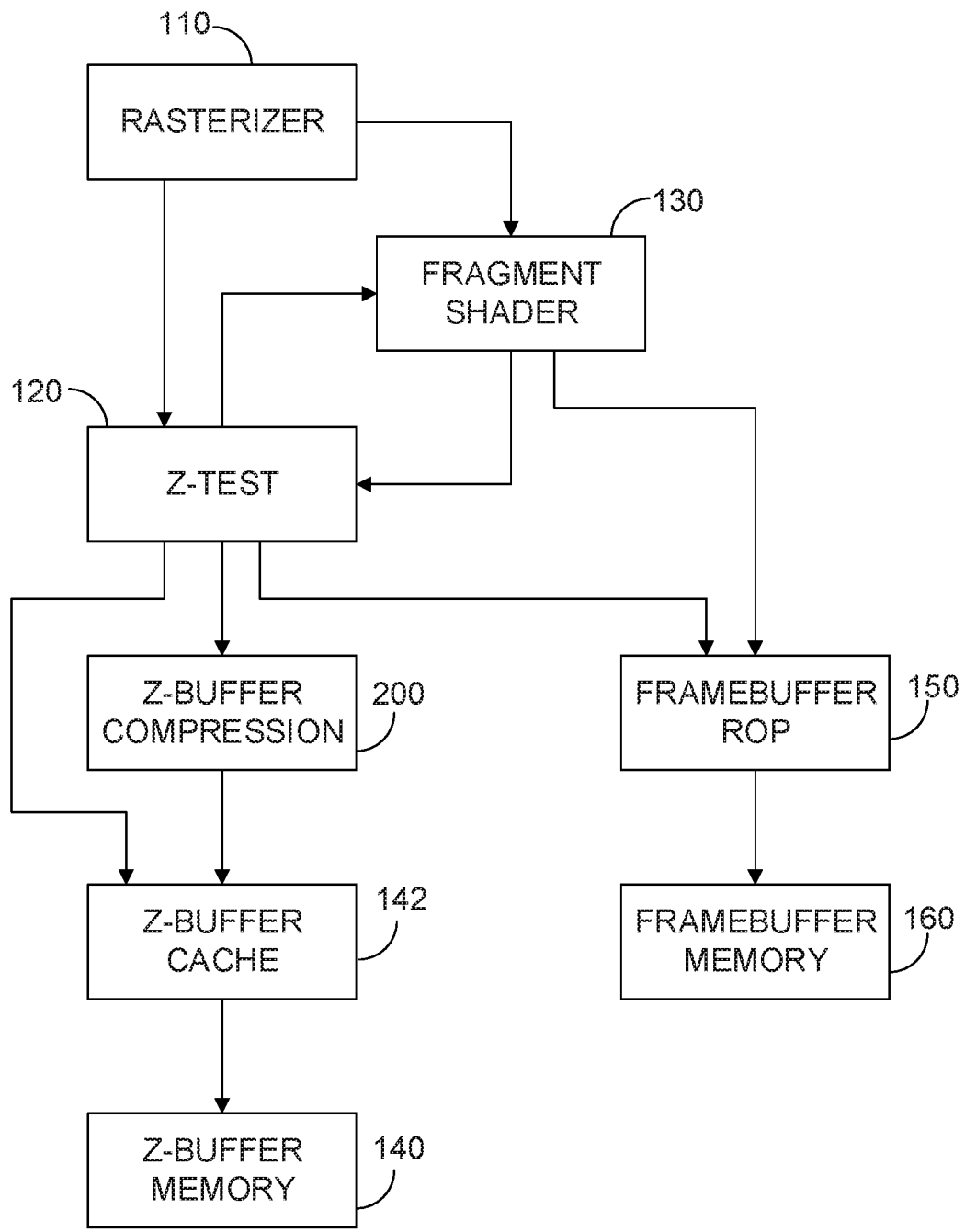
FIG. 1—is a schematic illustration of a z-buffer data flow, implemented in according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

Z-buffer compression may be useful for reducing memory usage bandwidth and for performance optimizations. A trackable method of doing the same may be additionally advantageous, as a lossy z-buffer compression scheme may noticeably alter a displayed object. A z-buffer compression unit receives an uncompressed tile, including a matrix of fragments, each representing a pixel and including a z-value. A minimum and maximum z-values of the tile are determined, and a comparison between each z-value of the tile to the minimum/maximum z-value generates a difference value. Basic tile information is then stored, and a compressed tile is stored in the z-buffer memory if the difference value is below a first threshold, such that each fragment is represented by a difference value and an indicator bit, to indicate if the difference is from the minimum z-value or the maximum z-value. The basic tile information includes the minimum z-value, and the maximum z-value.

FIG. 1 is a non-limiting and exemplary schematic illustration of a z-buffer data flow, implemented in according to an embodiment. A rasterizer 110 is configured to receive an image vector and generate as an output a raster image. A raster image includes a plurality of pixels, for display on a screen, for example. The rasterizer 110 is further configured to output the plurality of pixels to a z-test component 120 and/or a fragment shader 130. A z-test component 120 may be implemented for example as a microelectronic circuit, a software module, or a combination thereof. The z-test component 120 receives a plurality of pixels, for example as a tile (each tile containing 'n' by 'm' fragments arranged as a matrix). The tile may also include associated xy coordinates, which place the tile on a location of the display. The z-test component 120 is operative for comparing a z-value of at least one fragment with the z-value of at least another fragment. This allows to determine which pixel should be shown on screen, and corresponds to a 'depth' of the pixel relative to the display screen, for example, or some other reference point. One possible flow of data (referred to as an early z-test) is to provide a fragment to the z-test component 120 by the rasterizer 110. The z-test component 120 compares the z-values of the current fragment to z-values of a previous fragment, the previous fragment being a fragment displayed before the current fragment. If the z-values of the current fragment exceed the z-values of the previous fragment, it should be displayed, and is then stored in z-buffer memory 140 (through the z-buffer cache 142), or framebuffer ROP (render operation output) 150 unit, or framebuffer memory 160. If the z-values of the current fragment are equal to the z-values of the previous fragment z-fighting occurs, a problem known in the art and solved using various methods. In certain embodiments, the fragment may be sent to a z-buffer compression unit 200, described in more detail herein with respect to FIG. 2. In some embodiments, the fragment shader 130 is provided with the fragment from the rasterizer 110. A fragment shader 130 is used to compute implicit derivatives, which are in turn used for example for texture sampling functions. The output of the fragment shader 130 may then pass to the z-test component 120. This process is referred to a late z-test. An early z-test may be advantageous to eliminate the need for executing the fragment shader 130 on a fragment which would not be visible on display.

Figure 2A:
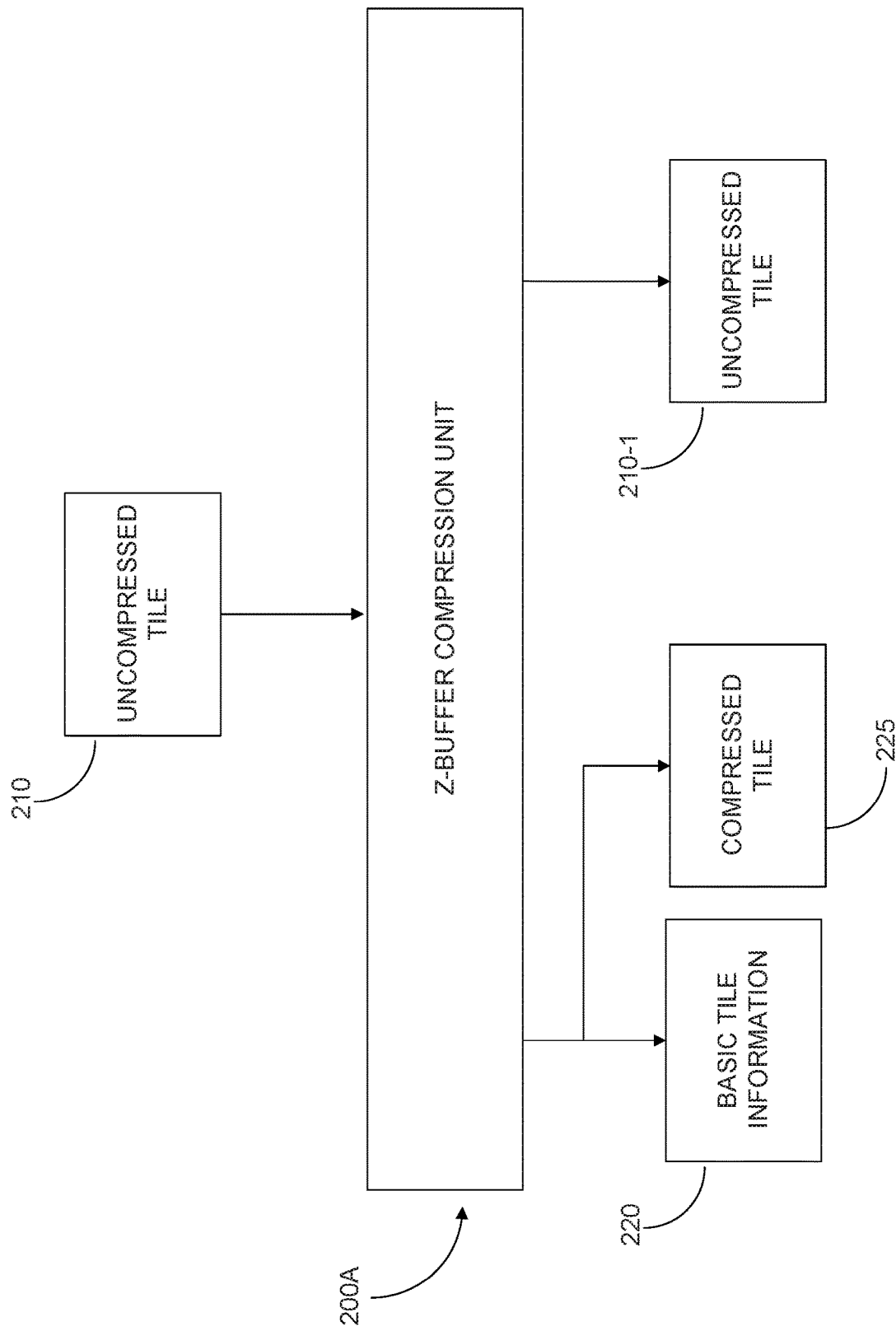
FIG. 2A—is a schematic illustration of a z-buffer compression unit implemented in accordance with an embodiment.

FIG. 2A is a non-limiting exemplary schematic illustration of a z-buffer compression unit 200 implemented in accordance with an embodiment. Z-buffer operations are expensive in terms of power and performance. A z-buffer compression unit 200 may reduce some of these computations and therefore reduce power consumption. In this exemplary embodiment, the rasterizer generates tiles of four by four fragments. When a tile is fed into the z-test unit basic tile information is retrieved from the z-buffer memory 140, or z-buffer cache 142. In this exemplary embodiment, eight bytes are retrieved from the z-buffer memory 140. The basic tile information may include a minimum z-value, a maximum z-value, a 'clear' bit, a 'compressed' bit, and bits reserved for stencil compression. When a frame is initiated, the z-buffer memory 160 needs to be clear. If a tile was previously cleared, a 'clear' bit may be set accordingly (for example, a bit set to '1' may indicate that the tile was cleared). The z-buffer compression unit 200A receives an uncompressed tile 210, and may determine, for each tile, a minimum z-value and a maximum z-value, and output this as basic tile information 220. The z-buffer compression unit 200A may also determine if the difference value between each fragment's depth value and the minimum z-value and/or maximum z-value can be stored in a predetermined number of bits. For example, a single byte per fragment may be allotted, such that a first bit represents whether the difference is from the minimum z-value or maximum z-value, and the remaining 7 bits represent the difference value. Thus, a tile in this example would be represented by 16 bytes, rather than 48 bytes for an uncompressed tile. If so, the z-buffer compression unit 200A generates a compressed tile 225 (according to the methods discussed below). In some exemplary embodiments, the minimum and maximum z-values may be selected so that they are 'local' values, i.e., allowing a predetermined number of fragments to be compressed. For example, if the absolute maximum value of the tile is 'x', this may create too large a difference value to be able to compress the tile. However, if the maximum value would be set to 'x-2' ('x' minus 2), it may be possible to compress the tile so all but a number of fragments are compressed in a lossless manner, with the remainder compressed in a lossy manner. For some applications this may be an acceptable tradeoff. The compression scheme is discussed in more detail below.

Figure 2B:
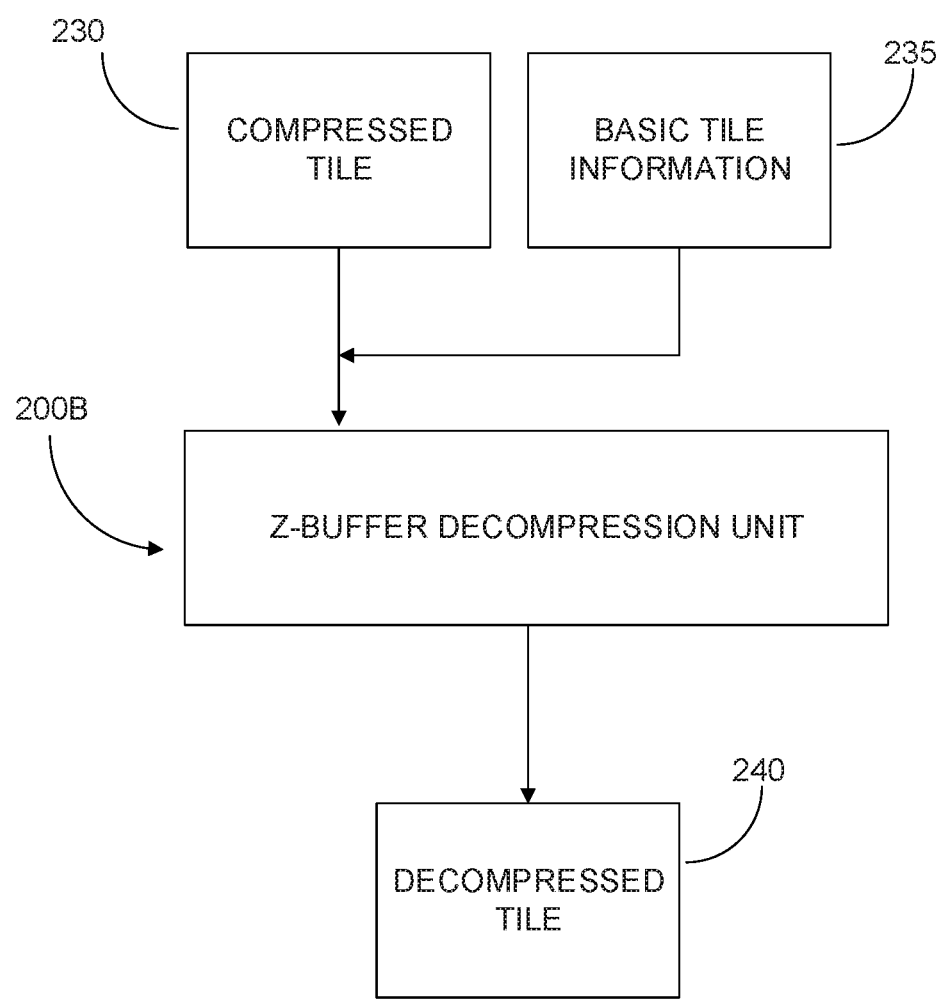
FIG. 2B—is a schematic illustration of a z-buffer decompression unit implemented in accordance with an embodiment.

FIG. 2B is a non-limiting exemplary schematic illustration of a z-buffer decompression unit 200B implemented in accordance with an embodiment. The z-buffer decompression unit 200B may receive a compressed tile 230 and corresponding basic tile information 235, and output a decompressed tile 240. In this exemplary embodiment, the z-buffer compression unit 200A and the z-buffer decompression unit 200B are shown as distinct units, however it is understood that they may be implemented as a single circuit as part of an IC (integrated circuit). In some embodiments, the z-buffer cache 142 may be used to store basic tile information related to one or more tiles. By storing this information in the z-buffer cache 142, this may reduce access to z-buffer memory 140, thereby decreasing power consumption. For example, by retrieving basic tile information for a current tile from the z-buffer cache 142, comparing the minimum and/or maximum z-values of the current tile with the minimum and/or maximum z-values of the previous tile, a conclusion on how (and if) to process the current tile may be drawn without the need for a memory access. In this example, if the maximum z-value of the current tile is lower than the minimum z-value of the previous tile, then the tile may be culled without having to access the entire tile from memory. In certain embodiments, it may be advantageous to provide a metric for efficient cache use. For example, a counter may be implemented to determine cache hits (vs. cache misses) on basic tile information, i.e. how many times basic tile information was requested and whether it was present in the cache or not. Another such metric may be how many tiles were culled or processed based on the basic tile information alone. Combining these two metrics would allow to measure the efficiency of the cache utilization, discussed in more detail below with respect to FIG. 6. In another exemplary embodiment, the z-buffer cache 142 may store compressed tiles. In such an embodiment, a counter may be implemented to determine cache hits (vs. misses) to further determine cache effectiveness. A cache may be considered effective when the ratio between hits and misses exceeds a certain value. In a similar fashion, uncompressed tiles may be stored in the z-buffer cache 142 and a counter may be implemented to determine cache hits (vs. misses) to further determine cache effectiveness.

Figure 3:
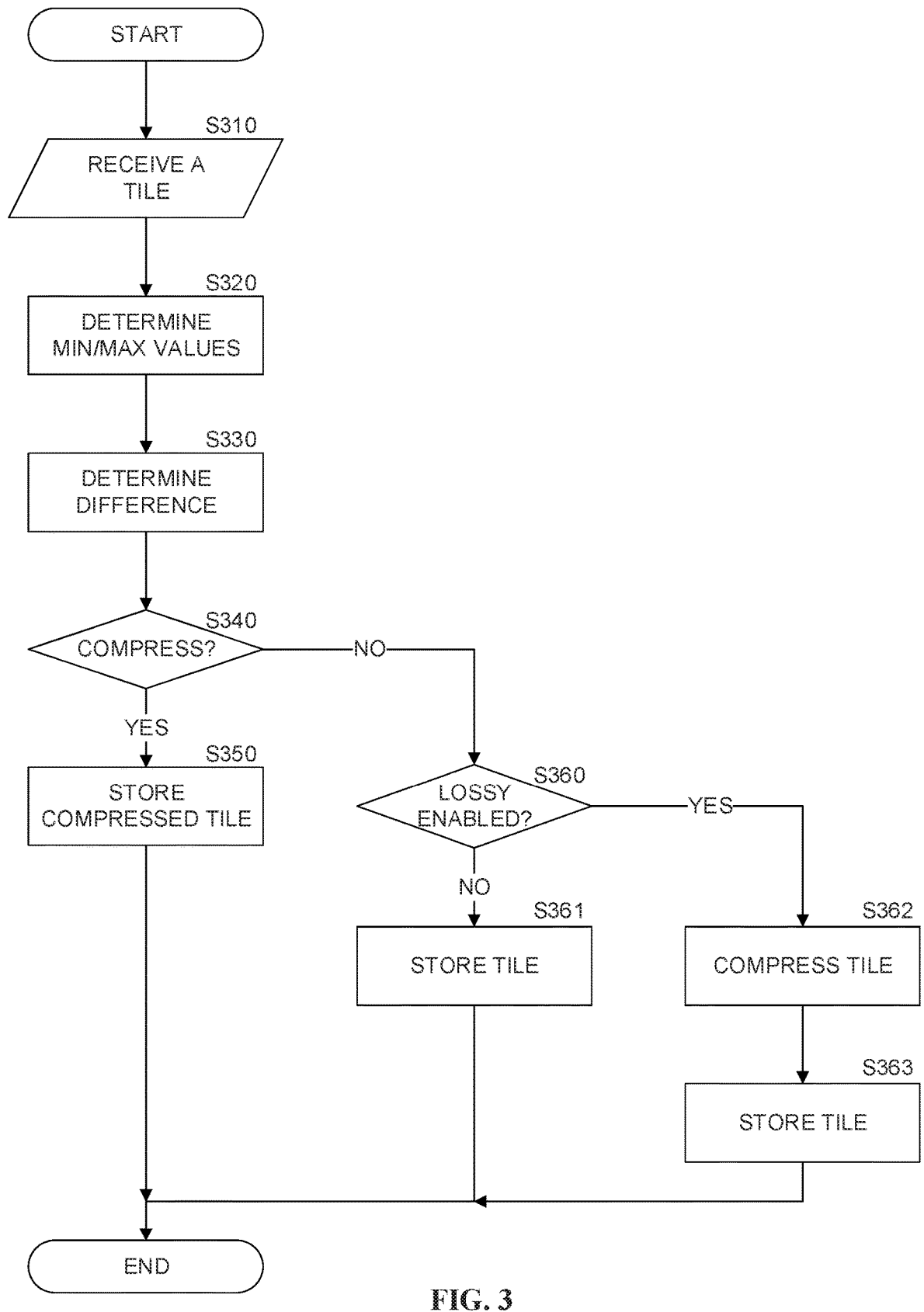
FIG. 3—is a flowchart of a computerized method for z-buffer compression, implemented in accordance with an embodiment.

FIG. 3 is a non-limiting exemplary flowchart of a computerized method for z-buffer compression, implemented in accordance with an embodiment. In S310 a tile is received by a z-buffer compression unit 200. In this exemplary embodiment, the tile is an arrangement of 4×4 fragments, each fragment having a depth value (z-value). In S320 a minimum z-value and a maximum z-value of the tile is determined. In some embodiments discussed below a local minimum and/or maximum z-values may be determined instead. In S330 a difference between each fragment's z-value, and the minimum z-value and/or the maximum z-value is determined. In S340 a check is performed to determine if each difference value can be represented by a predetermined memory size. In this exemplary embodiment, the difference value needs to be represented in 7 bits. If 'yes' execution continues at S350, otherwise execution continues at S360. In S350 basic tile information and the compressed tile are stored in the z-buffer memory 140. Basic tile information may include the minimum z-value, the maximum z-value, a 'clear' bit, a 'compressed' bit set to a value indicating compression was achieved, and bits reserved for stencil compression. The compressed tile information may include a bit indicating if the difference value is offset from the maximum or minimum z-value, and the difference value, represented as a predetermined number of bits (in this case 7 bits). In some embodiments, a new tile may be generated, after completing a z-test (early or late). For example, a portion of the fragments from the new tile may be merged with a portion of the fragments of the current tile, so that no overlap occurs. The new tile may then be processed for compression. This method results in a loss-less compression, as tiles which are not compressible are not compressed. However, this may not always be the case. In S360 a check is performed to determine if lossy compression is enabled. If 'no' execution continues at S361, otherwise execution continues at S362. In S361 the uncompressed tile is stored in the z-buffer memory. In this exemplary embodiment, the tile is stored in the following fashion: a first group of bytes (8 bytes, in this example) store basic tile information, a second group of bytes (16 bytes) storing the first 16 pixel values, and a third group of bytes (16 bytes), storing the second 16 pixel values, for a total of 32+8 bytes. In S362 a lossy compression is performed on the tile. For example, a local minimum or maximum z-value may be determined, allowing all but a determined number of fragments to be compressed in a lossless manner. The determined number of fragments may be predetermined, dynamic, etc. The determined number of fragments are compressed in a lossy manner. In S363 the lossy compressed tile is stored in the z-buffer memory 140. In certain embodiments, a counter may be implemented to determine the ratio between any of: lossless compressed tiles, uncompressed tiles, and lossy compressed tiles.

FIG. 4 is an exemplary and non-limiting schematic illustration of a tile compression scheme, implemented in accordance with an embodiment. A first tile 410 includes a plurality of fragments arranged as a matrix. In this exemplary embodiment, the first tile 410 is comprised of 16 fragments arranged as a 4×4 matrix. The first tile 410 includes a first minimum z-value fragment 411 having a hexadecimal value of '484848', and a first maximum z-value fragment 412 having a value of '8a8a8a'. The first tile further includes a third fragment 413 having a value of '555555'. The difference between the minimum z-value fragment value and the third fragment value is 'd0d0d0', which exceeds 7 bits. The difference between the maximum z-value fragment value and the third fragment value is '353535, which likewise exceeds 7 bits. Therefore, the first tile 410 cannot be compressed by this method in a lossless manner. A second tile 420 includes a plurality of fragments arranged as a matrix. In this exemplary embodiment, the second tile 420 is comprised of 16 fragments arranged as a 4×4 matrix. The second tile 420 includes a second minimum z-value fragment 421 having a hexadecimal value of '484848', and a second maximum z-value fragment 422 having a value of '8a8a94. In case of second tile 420, the difference value between every fragment and the second maximum z-value and/or the second minimum z-value can be represented by 7 bits. The compressed tile 430 would therefore be a 16 byte representation of the second tile 420.

Figure 5:
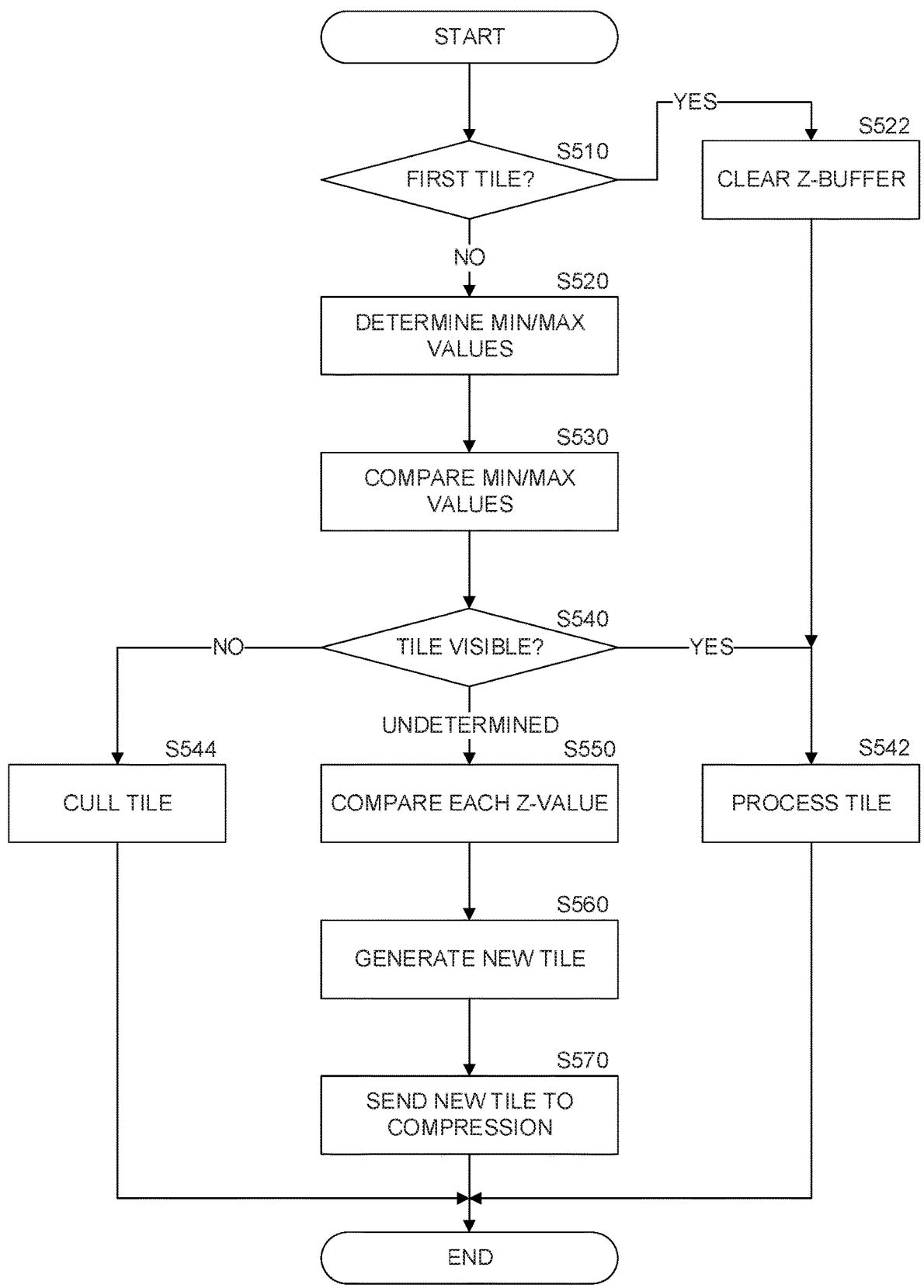
FIG. 5—is flowchart of a computerized method for a z-test according to an enabled z-buffer compression scheme, implemented in accordance with an embodiment.

FIG. 5 is an exemplary and non-limiting flowchart of a computerized method for a z-test according to an enabled z-buffer compression scheme, implemented in accordance with an embodiment. In S510 a check is performed to determine if this is the first tile rendered at the associated coordinates. At the start of a frame, the z-buffer memory needs to be cleared, therefore by fetching the basic tile information, an indication costing 1 bit only is achieved. To achieve this the basic tile information of the tile is read (a cost of 8 bytes in this example). If the check returns a 'no', execution continues at S520, otherwise execution continues at S522. In S522 the z-buffer is memory is cleared. In S520 the minimum and maximum z-values of the current tile are determined. In S530, a comparison is generated by the z-test unit of the minimum z-value and maximum z-value of the current tile to the minimum and maximum z-values of a previous tile having the same associated xy coordinates. In S540 a check is performed to determine if all the fragments of the current tile are visible/not visible or undetermined. This may be performed by comparing minimum/maximum z-values of the current and previous tiles, and determining if the tile should be processed or culled. If all fragments are visible, execution continues at S542. In S542 the tile is processed by a GPU communicatively coupled with the z-buffer memory. If all fragments are not visible, execution continues at S544, where the tile is culled. If the check returns 'undetermined', execution continues at S550. In S550 the z-value of each fragment of the current tile is compared by the z-test unit with the z-value of each corresponding fragment of the previous tile. If the current tile is a compressed tile, the z-values are determined by reading the basic tile information (8 bytes), and the compressed tile information (16 bytes). The z-buffer compression unit 200 then decompresses the current tile by reading for each fragment the basic tile information, and the relevant difference value. If the tile was not compressed, the full tile is read from memory (or cache), and each z-value is compared as detailed above. In S560 a new tile is generated from one or more fragments from the previous tile and one or more fragments from the current tile. In S570 the new tile is sent to the z-buffer compression unit 200 to determine if the new tile can be compressed, as described in more detail for example with respect to FIG. 3.

Figure 6:
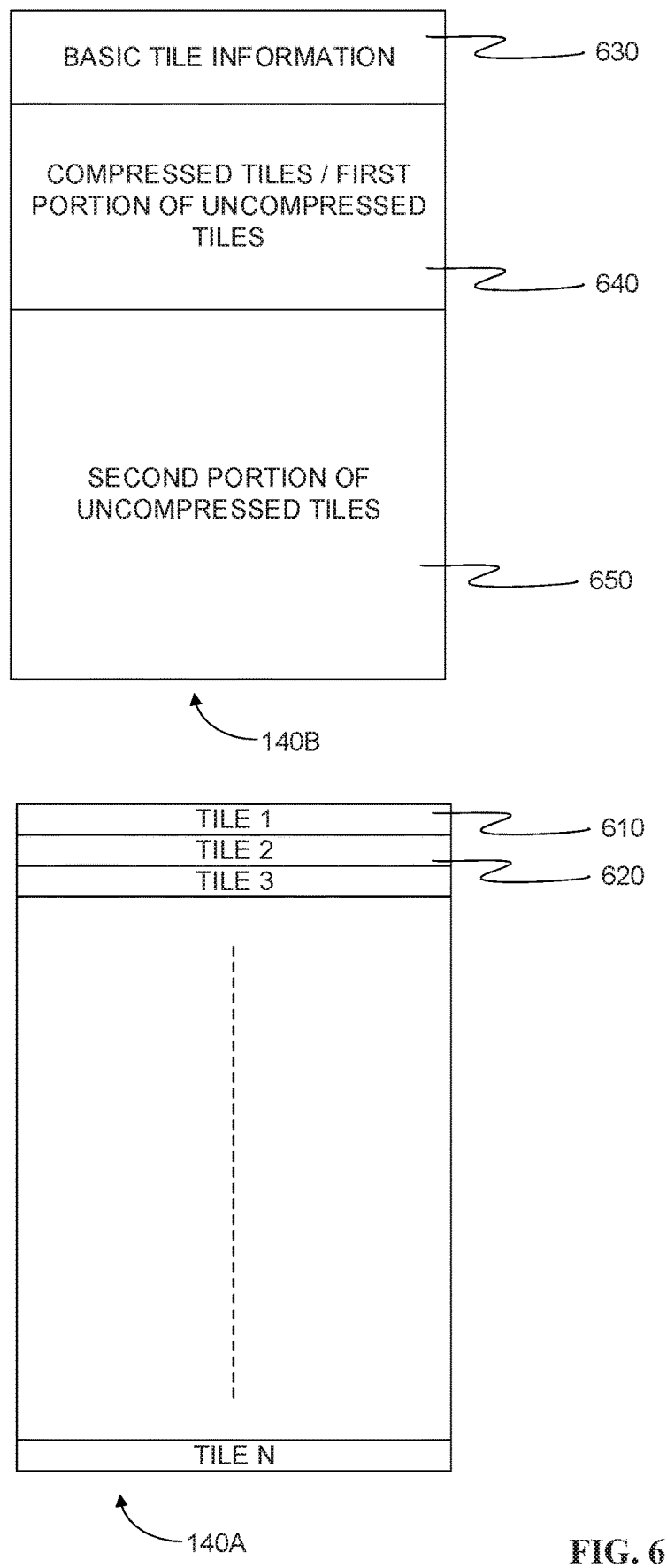
FIG. 6—is a schematic illustration of an optimized z-buffer memory arrangement, implemented in accordance with an embodiment.

FIG. 6 is a non-limiting exemplary schematic illustration of an optimized z-buffer memory arrangement, implemented in accordance with an embodiment. An exemplary prior art embodiment is also presented for reference. A prior art arrangement of tiles in the z-buffer memory 140A may include 'n' memory portions, each portion corresponding to a tile. Thus, a first tile is stored in a first memory portion 610, a second tile is stored in a second memory portion 620, etc. According to the methods discussed herein, it may be advantageous to store information in the z-buffer memory 140B as following: a first memory portion 630, containing continuously therein the basic tile information for each tile, a second memory portion 640 containing continuously therein the compressed tiles, or for uncompressed tiles the first portion of the not compressed tiles (the first portion corresponding in size to the compressed tiles size), and a third memory portion 650 containing continuously therein the remaining portions of the not compressed tiles. If, for example, the basic tile information is sufficient to determine execution, then having all the basic tile information in a continuous memory allows for a more efficient memory access, reducing unnecessary computation and lowering power consumption. This arrangement may be implemented in the z-buffer memory 140, the z-buffer cache 142, or a combination thereof.

Figure 7:
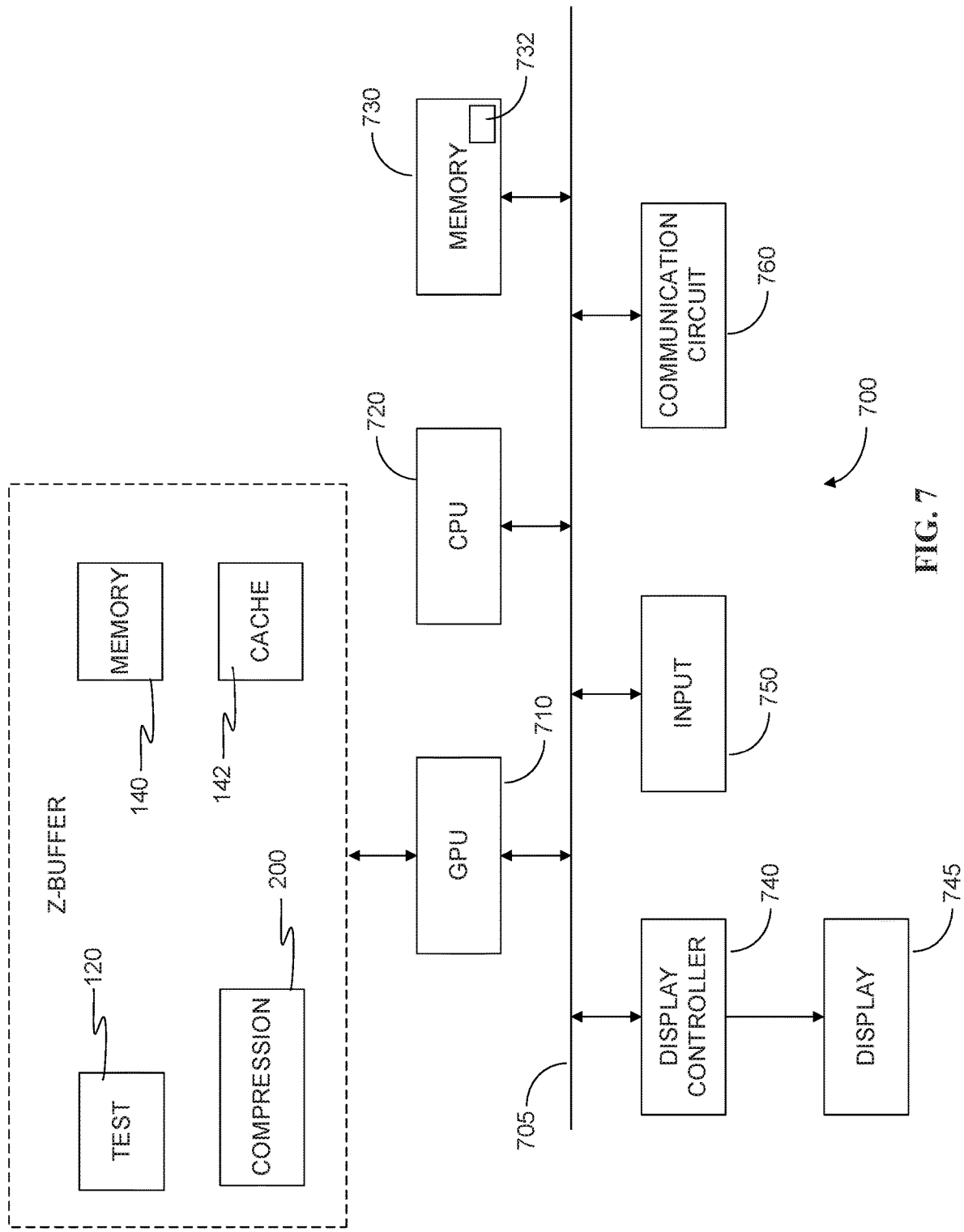
FIG. 7—is a schematic illustration of a computing system 700 with a z-buffer compression enabled GPU, implemented in accordance with an embodiment.

FIG. 7 is an exemplary and non-limiting schematic illustration of a computing system 700 with a z-buffer compression enabled GPU, implemented in accordance with an embodiment. The system 700 includes a graphic processing unit (GPU) 710. The GPU 710 is communicatively coupled with a z-buffer compression unit 200, a z-test component 120, a z-buffer memory 140, and a z-buffer cache 142. The GPU 710 may be additionally connected to a serial processing element, such as a CPU 720, which in turn may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The GPU 710 is coupled via a bus 705 to a memory 730. The memory 730 may include a memory portion 732 that contains instructions that when executed by the CPU 720, and/or the GPU 710 causes the system 700 to perform the methods described in more detail herein. The memory 730 may be further used as a working scratch pad for the GPU 710, the CPU 720, a temporary storage, and others, as the case may be. The memory 730 may be a volatile memory such as, but not limited to random access memory (RAM), or non-volatile memory (NVM), such as, but not limited to, Flash memory. The system 700 may further include a display control (DC) 740. The DC 740 is operative for controlling a display 745. The display 745 may be, for example, an LCD, OLED, e-ink and the like. In an embodiment, the display 745 may be a low-power, or ultra-low power display. The system 700 may also include an input 750, such as a touchscreen, dial, keyboard, microphone, combinations thereof and the like. The system 700 may also include a communication circuit 760. The communication circuit 760 may be operative to connect the system 700 to a network. In an embodiment, the network may be configured to provide connectivity of various sorts, as may be necessary, including but not limited to, wired and/or wireless connectivity, including, for example, local area network (LAN), wide area network (WAN), low power WAN (LP-WAN), metro area network (MAN), worldwide web (WWW), Internet, and any combination thereof, as well as cellular connectivity. The GPU 710, the CPU 720 and/or the memory 730 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, CAD tools, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A computerized method for improved memory utilization of a graphic processor unit (GPU) z-buffer memory, the method comprising:
   receiving by a z-buffer compression unit an uncompressed tile, the uncompressed tile comprising a matrix of fragments, each fragment representing a pixel for display, and each fragment comprising a z-value of the pixel;
   determining a minimum value of z-values of the tile;
   determining a maximum value of the z-values of the tile;
   comparing each z-value of the tile to the minimum z-value and/or the maximum z-value to generate a difference value;
   storing: basic tile information, and a compressed tile in a z-buffer memory, in response to the difference value being below a first threshold, the compressed tile comprising a matrix corresponding in dimension to the tile, wherein each fragment is represented by a difference value and an indicator bit, to indicate if the difference is from the minimum z-value or the maximum z-value, and the basic tile information comprising: the minimum z-value, and the maximum z-value;
   requesting basic tile information of a current tile;
   comparing the minimum z-value of a previous tile to the maximum z-value of the current tile, wherein the previous tile is a tile received by the z-buffer compression unit immediately prior to the current tile;
   comparing the minimum z-value of the current tile to the maximum z-value of the previous tile;
   culling the current tile, in response to the minimum z-value of the previous tile being larger than the maximum z-value of the current tile; and
   rendering the current tile by the GPU, in response to the minimum z-value of the current tile being larger than the maximum z-value of the previous tile.

2. The computerized method of claim 1, wherein the basic tile information further comprises: a second indicator bit, to indicate if the previous tile was cleared.

3. The computerized method of claim 1, further comprising:
   storing basic tile information, and the uncompressed tile in the z-buffer memory, in response to the difference value being above a first threshold.

4. The computerized method of claim 3, further comprising a first counter, the first counter incrementing in response to storing basic tile information, and a compressed tile in the z-buffer memory; and a second counter incrementing in response to storing basic tile information, and an uncompressed tile in the z-buffer memory.

5. The computerized method of claim 3, in which z-buffer information is stored in fixed point or floating point or logarithmic arithmetic format or a combination of the said formats.

6. The computerized method of claim 3, in which z-buffer information is stored in a range of 8-bit values or 16-bits values or 24-bits values or 32-bits values or a different bit range.

7. The computerized method of claim 3, further comprising:
storing at one or more of: basic tile information, compressed tile, and uncompressed tile in a z-buffer cache.

8. The computerized method of claim 7, further comprising a first counter incrementing when an object is read from the cache, and a second counter incrementing when the object was not available in cache, the object being: basic tile information, a compressed tile, an uncompressed tile.

9. The computerized method of claim 1, further comprising:
receiving a compressed tile and basic tile information of the compressed tile;
generating a decompressed tile based on the basic tile information and the compressed tile.

10. The computerized method of claim 1, further comprising a first counter, incrementing in response to culling the current tile; and a second counter, incrementing in response to rendering the current tile.

11. The computerized method of claim 1, further comprising:
comparing each z-value of the current tile to a corresponding z-value of a previous tile, in response to the minimum z-value or the maximum z-value of the current tile being in between the maximum z-value of the previous tile and the minimum z-value of the previous tile.

12. The computerized method of claim 11, further comprising:
generating a new tile, comprising one or more fragments of the previous tile, and one or more fragments of the current tile, such that each fragment is selected from the tile where the fragment has a higher z-value.

13. The computerized method of claim 12, further comprising:
sending the new tile to the z-buffer compression unit.

14. The computerized method of claim 1, wherein the z-buffer memory and/or z-buffer cache comprises:
a first portion, storing therein basic tile information;
a second portion, storing therein compressed tiles, or a first portion of uncompressed tiles, each first portion of uncompressed tile equal in bit size to the compressed tile; and
a third portion, storing thereon a second portion of the uncompressed tiles.

15. A non-transitory computer readable information storage media having stored thereon instructions, that when executed, perform a method for improved memory utilization of a graphic processor unit (GPU) z-buffer memory, the method comprising:
receiving by a z-buffer compression unit an uncompressed tile, the uncompressed tile comprising a matrix of fragments, each fragment representing a pixel for display, and each fragment comprising a z-value of the pixel;
determining a minimum value of z-values of the tile;
determining a maximum value of the z-values of the tile;
comparing each z-value of the tile to the minimum z-value and/or the maximum z-value to generate a difference value;
storing: basic tile information, and a compressed tile in a z-buffer memory, in response to the difference value being below a first threshold, the compressed tile comprising a matrix corresponding in dimension to the tile, wherein each fragment is represented by a difference value and an indicator bit, to indicate if the difference is from the minimum z-value or the maximum z-value, and the basic tile information comprising: the minimum z-value, and the maximum z-value;
requesting basic tile information of a current tile;
comparing the minimum z-value of a previous tile to the maximum z-value of the current tile, wherein the previous tile is a tile received by the z-buffer compression unit immediately prior to the current tile;
comparing the minimum z-value of the current tile to the maximum z-value of the previous tile;
culling the current tile, in response to the minimum z-value of the previous tile being larger than the maximum z-value of the current tile; and
rendering the current tile by the GPU, in response to the minimum z-value of the current tile being larger than the maximum z-value of the previous tile.

16. The media of claim 15, wherein the basic tile information further comprises: a second indicator bit, to indicate if the previous tile was cleared.

17. The media of claim 15, further comprising:
storing basic tile information, and the uncompressed tile in the z-buffer memory, in response to the difference value being above a first threshold.

18. The media of claim 17, further comprising a first counter, the first counter incrementing in response to storing basic tile information, and a compressed tile in the z-buffer memory; and a second counter, incrementing in response to storing basic tile information, and an uncompressed tile in the z-buffer memory.

19. The media of claim 17, further comprising:
storing in a z-buffer cache one or more of: basic tile information, compressed tile, and uncompressed tile.

20. The media of claim 19, further comprising a first counter incrementing when an object is read from the cache, and a second counter incrementing when the object was not available in cache, the object being any of: basic tile information, a compressed tile, an uncompressed tile.

21. The media of claim 15, further comprising:
receiving a compressed tile and basic tile information of the compressed tile;
generating a decompressed tile based on the basic tile information and the compressed tile.

* * * * *